Figure 1:
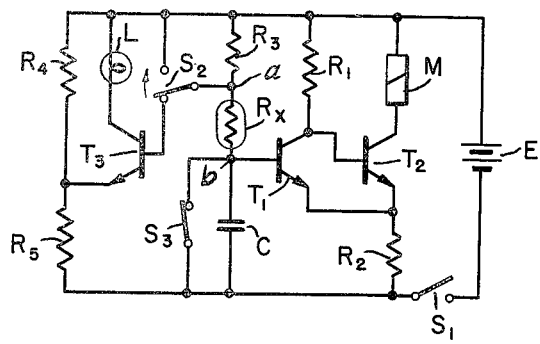

United States Patent [19]
Kitai

[11] 3,928,861
[45] Dec. 23, 1975

[54] ELECTRONIC CIRCUIT INDICATING LIGHT LEVEL AND CONTROLLING EXPOSURE OF CAMERA

[75] Inventor: Kiyoshi Kitai, Tokyo, Japan

[73] Assignee: Kabushiki Kaisha Hattori Tokeiten, Japan

[22] Filed: Dec. 2, 1971

[21] Appl. No.: 204,260

[30] Foreign Application Priority Data
Dec. 3, 1970    Japan.............................. 45-106451

[52] U.S. Cl. ................................ 354/60 L; 354/51
[51] Int. Cl.² ....................... G03B 7/08; G03B 17/18
[58] Field of Search...... 95/10 CE, 10 CT; 356/226; 354/48, 50, 51, 60 R, 60 L, 60 E

[56] References Cited
UNITED STATES PATENTS

| | | | |
|---|---|---|---|
| 3,460,450 | 8/1969 | Ogihara .................................. | 95/10 |
| 3,487,757 | 1/1970 | Kiper ..................................... | 95/10 |
| 3,516,750 | 6/1970 | Schmitt................................ | 95/10 X |
| 3,581,643 | 6/1971 | Yoshimura.......................... | 95/10 X |
| 3,613,533 | 10/1971 | Kitai ..................................... | 95/10 |
| 3,618,489 | 11/1971 | Akiyama................................ | 95/10 |

Primary Examiner—Joseph F. Peters, Jr.
Attorney, Agent, or Firm—Robert E. Burns; Emmanuel J. Lobato; Bruce L. Adams

[57] ABSTRACT

An electronic circuit for indicating available light level and controlling the shutter of a camera comprises three circuit elements namely a photoelectric element, a comparison resistor and a capacitor connected in series with one another across a battery with first and second connecting points between the three elements. A timing circuit including an electromagnet controlling the closing of the shutter is connected to one of the connecting points. A timing switch is connected across the capacitor. An indicating circuit includes at least one signal light. A change-over switch when in one position connects the indicating circuit to the other of the two connecting points to provide an indication of available light level before an exposure is made and in another position shorts the comparison resistor so that upon opening of the timing switch, the rate of charging of the capacitor is controlled by the photoelectric element to control the exposure time according to the available light.

10 Claims, 4 Drawing Figures

ELECTRONIC CIRCUIT INDICATING LIGHT LEVEL AND CONTROLLING EXPOSURE OF CAMERA

The present invention relates to an electronic circuit for controlling the operation of the shutter of a photographic camera to provide automatically a proper exposure time according to the brightness of a subject to be photographed and, prior to release of the shutter, providing an indication as to whether the brightness of the subject is higher or lower than a selected level.

It is known that a photoelectric element used to control the exposure time automatically may also be used in a brightness level detecting device. However known devices of this kind have the defect that a number of change-over switches, diodes or other components are needed to carry out the change-over from brightness detection to automatic shutter control.

It is an object of the present invention to provide circuitry in which the change-over of operation from preliminary brightness detection to automatic shutter control is effected in a simple manner with a minimum number of components so that the manufacturing costs are reduced and the reliability of the camera is increased.

In accordance with the invention, three circuit elements namely, a photoelectric element, a comparison resistor and a capacitor are connected in series with one another across the terminals of a battery or other DC power source to form in effect, a voltage divider with different voltages at connecting points between the three circuit elements. A timing circuit including an electromagnet controlling the closing of the camera shutter is connected to one of the connecting points. A timing switch connected across the capacitor is closed to short-circuit the capacitor during the preliminary light detecting function and is opened upon opening of the shutter so that the capacitor is charged at a rate depending on the conductance of the photoelectric element and hence on the brightness of the subject so as to provide an automatic exposure time according to subject brightness. An indicating circuit includes at least one signal light for indicating the brightness of the subject, for example, to indicate that the brightness is below a predetermined level needed for satisfactory photographing of the subject. A change-over switch when in one position connects the indicating circuit elements to provide an indication of available light before an exposure is made and in another position short-circuits the comparison resistor so that upon opening of the timing switch the rate of charging of the capacitor is controlled by the photo-electric element so as to control the exposure time according to the available light.

The invention will be more fully understood from the following description in conjunction with the accompanying drawings in which FIGS. 1,2,3 and 4 are electronic circuit diagrams illustrating respectively preferred embodiments of the present invention.

In the circuit shown by way of example in FIG. 1, three circuit elements, namely a photoconductive element Rx, for example a photoresistor, a comparison resistor R3 and and a capacitor C are connected in series with one another and with a switch S1 across the terminals of a direct current power source and shown as battery E. An indicating circuit comprises a transistor T3 and an indicating lamp L in the collector circuit of the transistor. The emitter of the transistor T3 is connected to an intermediate point of a voltage divider comprising resistors R4 and R5 connected in series across the voltage source E. When in the position shown in FIG. 1, a change-over switch S2 connects the base of the transistor T3 to a connecting point $a$ between the photoconductive element Rx and the comparison resistor R3. In its other position, the change-over switch S2 disconnects the indicating circuit from the connecting point $a$ and short-circuits the resistor R3. A timing circuit comprises transistors T1 and T2, resistors R1 and R2 and an electromagnet M which controls the closing of the shutter. The base of the transistor T1 is connected to a connecting point $b$ between the photoconductive element Rx and the capacitor C. A timing switch S3, when closed, short-circuits the capacitor C.

The operation of the circuit shown in FIG. 1 is as follows: when the release button of the camera is pushed down, the electric source switch S1 is closed by this action. At this time the timing switch S3 is closed, transistor T1 is non-conducting and transistor T2 is conducting so that the electromagnet M is energized. Switch S2 is in the position shown so as to connect the base of the transistor T3 to the connecting point $a$ between the comparison resistor R3 and the photoconductive element Rx. Since the resistor R3 and the photoconductive element Rx are connected in series with one another across the electric source E through the timing switch S3 and the electric source switch S1, the voltage at the connecting point $a$ is dependent on the resistance of the photoconductive element Rx in comparison with that of the resistor R3 and this voltage is applied to the base of the transistor T3 through the change-over S2. In case the voltage at the connecting point $a$ is higher than the emitter voltage of the transistor T3 as determined by the resistors R4 and R5, the transistor T3 becomes conductive to light the lamp L indicating that the brightness of the subject to be photographed is lower than the predetermined level required for an exposure.

In case the brightness of the subject to be photographed is higher than the predetermined level, the resistance value of the photoconductive element Rx is lower and the voltage of the connecting point $a$ is lower than the emitter voltage of the transistor T3 so that the transistor does not conduct and the lamp L is not lighted. When the release button of the camera is pushed down farther, the change-over switch S2 is changed over in the direction of the arrow to the opposite contact so as to short-circuit the resistor R3 and at the same time disconnect the transistor T3 from the connecting point $a$ so that the indicating circuit becomes inactive. On pushing down the release button of the camera still farther, the shutter is actuated and the timing switch S3 is opened. The capacitor C is thereupon charged through the photoconductive element Rx at a rate depending on the resistance of the photoconductive element and hence on the brightness of the subject being photographed. When the charging voltage of the capacitor C reaches a point where it exceeds the emitter voltage of the transistor T1, the transistor T1 becomes conductive and the transistor T2 is cut off so that the electromagnet M is de-energized and the camera shutter is closed. The exposure time is thus automatically controlled in accordance with the brightness of the subject being photographed.

In this embodiment the change-over switch S2 has been described as being interlocked with the release button of the camera so as to be switched from one position to another when the release button is pushed down by a predetermined amount. Alternatively the change-over may be made by interlocking the change-over switch with the starting of the shutter before the timing switch S3 is opened. As a further modification, the change-over switch S2 is omitted, the base of the transistor T3 is connected to the connecting point $a$ and a switch of the normally opened type is installed to short-circuit the resistor R3 before the timing switch S3 is opened.

Figure 2:
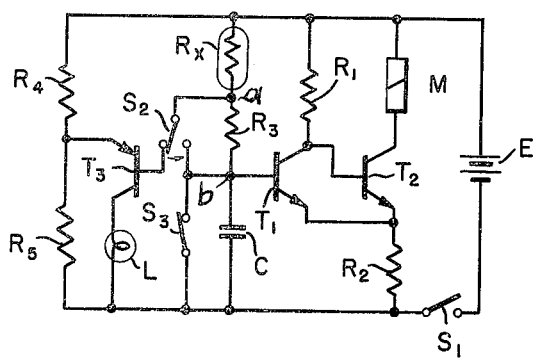

The embodiment shown in FIG. 2 differs from that of FIG. 1 only in that the photoconductive element Rx and the resistor R3 are connected in reverse positions, and the transistor T3 controlling the lamp L is of the PNP type. When with the circuit in the state shown in FIG. 2 the electric source switch S1 is closed by pressing the release button of the camera, the voltage applied to the base of the transistor T3 through the change-over switch S2 is the voltage of the electric source E divided by the resistance of the photoconductive element Rx and the comparison resistor R3. If the brightness of the subject to be photographed is lower than a predetermined level, the resistance value of the photoconductive element Rx is higher and the base voltage of the transistor T3 becomes lower than the emitter voltage so that the transistor T3 becomes conductive to light the lamp L.

Figure 3:
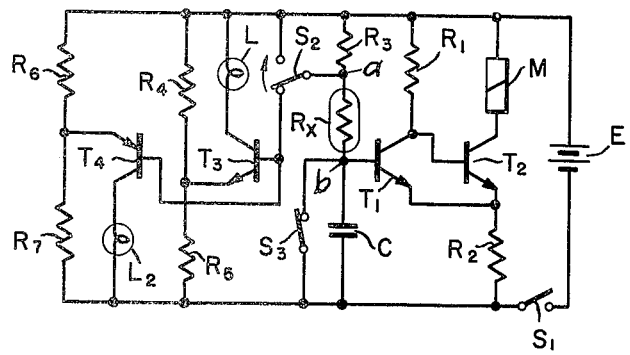

In the embodiment shown in FIG. 3, a PNP type transistor T4, resistors R6 and R7 and a second lamp L2 are added to the embodiment of FIG. 1 so as to make it possible to indicate cases when the brightness of the subject to be photographed is lower or higher than two predetermined levels respectively. With this arrangement the lamp L is lighted when the brightness of the subject to be photographed is lower than a predetermined limit level on the low brightness side and the lamp L2 is lighted when the brightness of the subject to be photographed is higher than a predetermined limit level on the high brightness side.

Figure 4:
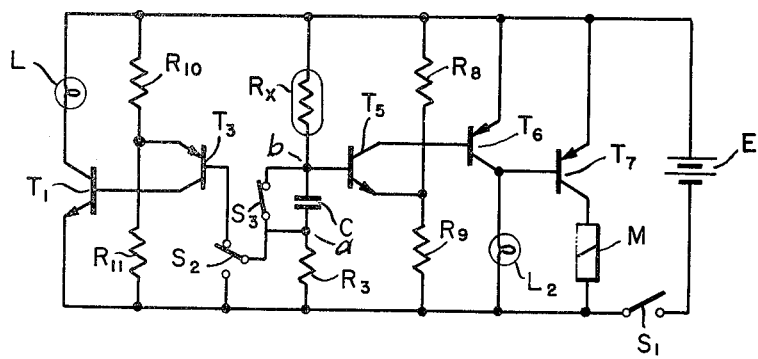

In the embodiment shown in FIG. 4 the three circuit elements are arranged in the order of the photoconductive element Rx, the capacitor C and the comparison resistor R3 between the positive and negative terminals of the electric source E respectively. The indicating circuit is shown as comprising a PNP transistor T8 the base of which is connected through the change-over switch S2 to a connecting point $a$ between the capacitor C and the comparison resistor R3, an NPN transistor T9 the base of which is connected to the collector of the transistor T8, an indicating lamp L in the collector circuit of the transistor T9 and resistors R10 and R11 biasing the emitter of the transistor T8. The timing circuit is shown as comprising an NPN transistor T5, the base of which is connected to the connecting point $b$ between the photoconductive element Rx and the capacitor C, emitter biasing resistors R8 and R9, a PNP transistor T6, the base of which is connected to the collector of the transistor T5 and a PNP transistor T7, the base of which is connected to the collector of the transistor T6. The electromagnet M controlling the closing of the camera shutter is in the collector circuit of the transistor T7 while a second signal lamp L2 is in the collector circuit of the transistor T6.

The operation of the embodiment shown in FIG. 4 is as follows: when, with the circuit in the state shown in FIG. 4, the electric source switch S1 is closed, the voltage divided by the electric source switch S1 is closed, the voltage divided by the resistance value of the photoconductive element Rx and that of the comparison resistor R3 is applied to the bases of the transistors T5 and T8. If this voltage is higher than the sum of the emitter voltage (determined by the resistors R8 and R9) of the transistor T5 and its VBE (ON voltage between the emitter and the base) the transistors T5 and T6 become conductive and the lamp L2 is lighted indicating that the brightness of the subject to be photographed is too high. On the other hand if the voltage at the connecting point $a$ is lower than the sum of the emitter voltage of the transistor T8 and its VBE, the transistors T8 and T9 become conductive and the lamp L is lighted indicating that the brightness of the subject to be photographed is lower than the predetermined level on the low brightness side. Hence if the brightness of the subject to be photographed is within the predetermined range, neither of the lamps L or L2 is lighted. Thereafter when the comparison resistor R3 is short-circuited by changing over the change-over switch S2 through further actuation of the release button or by the shutter actuating mechanism of the camera, the transistors T5 and T6 become non-conductive and the transistor T7 becomes conductive so that the electromagnet M is energized. Then when the shutter is started, the timing switch S3 is opened and the capacitor C is charged through the photoconductive element Rx. When the charging voltage reaches the action voltage of the transistor T5, the transistors T5 and T6 become conductive and the transistor T7 becomes non-conductive so that the electromagnet M is de-energized and the shutter is closed. At this time the lamp L2 is lighted and thereby indicates that the exposure operation has been completed. If, however, it is not desired to have the lamp L2 lighted at the end of an exposure, a change-over switch is provided to connect a resistance in place of the lamp L2 before the starting of the shutter.

It will be thus seen that in accordance with the invention, there is provided a very simple and reliable circuitry for utilizing a photoconductive element Rx to indicate prior to an exposure the brightness level of the subject to be photographed and thereafter using the same photoconductive element for timing the exposure in accordance with the brightness of the subject. There is thus provided an electronic circuit of greater reliability and having a smaller number of switches than in the circuits heretofore available.

While four preferred embodiments in accordance with the present invention have been shown by way of example in the accompanying drawings and have been particularly described, it will be understood that features of the several components are mutually interchangeable in so far as they are compatible and that various modifications may be made in the circuitry shown. Although the various circuit components have been illustrated as separate elements, it will be understood that they may be appropriately combined in integrated circuitry in order to reduce the space required.

What I claim and desire to secure by Letters Patent is:

1. In a photographic camera, an indicating and shutter control circuit comprising a power source, three circuit elements namely a single photoelectric element, a comparison resistor and a capacitor connected in series with one another across said power source with first and second connecting points between said circuit elements, said circuit comprising an indicating circuit and a timing circuit, said indicating circuit including solely electrical components comprising said power source, said photoelectric element, said comparison resistor, level indicating means and a first amplifying means for feeding said level indicating means and having a control terminal, said timing circuit including said power source, said single photoelectric element, said capacitor, a timing switch for short circuiting said capacitor, an electromagnet controlling the closing of the shutter and second amplifying means for feeding said electromagnet and having a control terminal connected to said first connecting point, said indicating circuit further comprising a change-over switch means having a first condition in which it connects said second connecting point with said control terminal of said first amplifying means to provide an indication of level of brightness of a subject to be photographed and a second condition in which it short circuits said comparison resistor to provide for control of timing circuit by said single photoelectric element.

2. A circuit according to claim 1, in which said circuit elements are arranged in the order of said comparison resistor, said photoelectric element and said capacitor between positive and negative terminals of said power source respectively, and in which said first amplifying means comprises an NPN transistor the base of which is connected by said change-over switch means to the connecting point between said comparison resistor and said photoelectric element and said level indicating means is in the collector circuit of said transistor.

3. A circuit according to claim 2, in which said second amplifying means comprises a first NPN transistor the base of which is connected to the connecting point between said photoelectric element and said capacitor and a second NPN transistor having its base connected with the collector of said first transistor, said electromagnet being connected in the collector circuit of said second transistor.

4. A circuit according to claim 1, in which said circuit elements are arranged in the order of said photoelectric element, said comparison resistor and said capacitor between positive and negative terminals of said power source respectively, and in which said first amplifying means comprises a PNP transistor the base of which is connected by said change-over switch means to the connecting point between said photoelectric element and said comparison resistor and said level indicating means is in the collector circuit of said transitor.

5. A circuit according to claim 4, in which said second amplifying means comprises a first NPN transistor the base of which is connected to the connecting point between said comparison resistor and said capacitor and a second NPN transistor having its base connected with the collector of said first transistor, said electromagnet being connected in the collector circuit of said second transistor.

6. A circuit according to claim 1, in which said circuit elements are arranged in the order of said comparison resistor, said photoelectric element and said capacitor between positive and negative terminals of said power source respectively, and in which said first ampliyfing means comprises an NPN transistor and a PNP transistor each having its base connected by said change-over switch means to the connecting point between said comparison resistor and said photoelectric element, and said indicating means comprises an indicating lamp in the collector circuit of each of said transistors, one of said lamps being illuminated to indicate that the available light is below a selected level and the other of said lamps being illuminated to indicate that the available light is above a selected level.

7. A circuit according to claim 6, in which said second amplifying means comprises a first NPN transistor the base of which is connected to the connecting point between said photoelectric element and said capacitor and a second NPN transistor having its base connected with the collector of said first transistor, said electromagnet being connected in the collector circuit of said second transistor.

8. A circuit according to claim 1, in which said circuit elements are arranged in the order of said photoelectric element, said capacitor and said comparison resistor between positive and negative terminals of said power source, and in which said first amplifying means comprises a PNP transistor having its base connected by said change-over switch means to the connecting point between said capacitor and said comparison resistor and an NPN transistor having its base connected with the collector of said PNP transistor, said indicating means comprising a signal lamp in the collector circuit of said NPN transistor, said lamp being illuminated when the available light is below a selected level.

9. A circuit according to claim 8, in which said second amplifying means comprises a second NPN transistor having its base connected to the connecting point between said photoelectric element and said capacitor, a second PNP transistor having its base connected with the collector of said second NPN transistor and a third PNP transistor having its base connected with the collector of said second PNP transistor, said electromagnet being connected in the collector circuit of said third PNP transistor.

10. A circuit according to claim 9, in which said indicating means further comprises a second signal lamp connected in the collector circuit of said second PNP transistor, said second signal light being illuminated when the available light exceeds a selected value.

* * * * *